(No Model.) 2 Sheets—Sheet 1.
P. V. PELTIER.
MACHINERY FOR ROLLING GLASS.
No. 508,748. Patented Nov. 14, 1893.
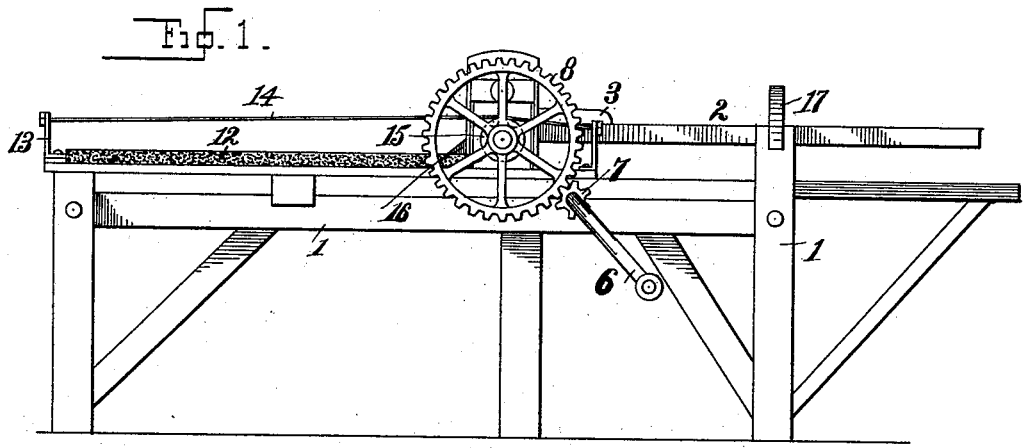
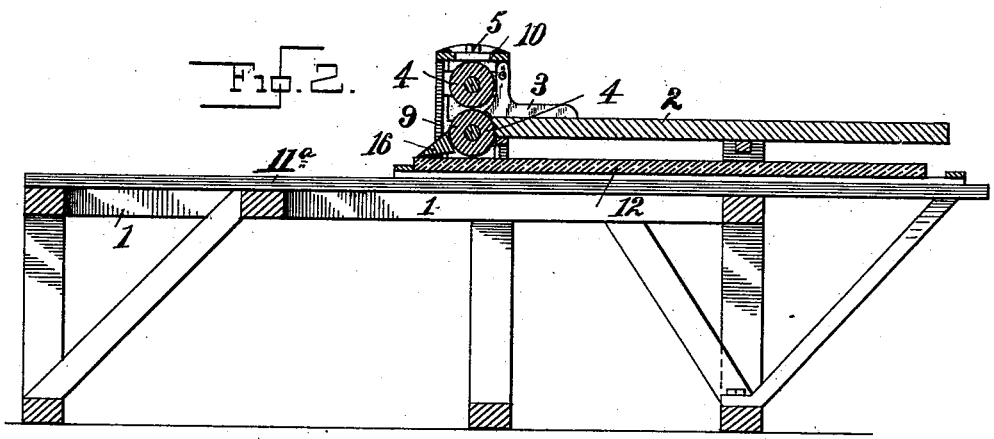
Witnesses  
Wm H. Courtland  
M. V. Bidgood
Inventor  
Peter V. Peltier  
By Knight Bros  
Attys
THE NATIONAL LITHOGRAPHING COMPANY,
WASHINGTON, D. C.

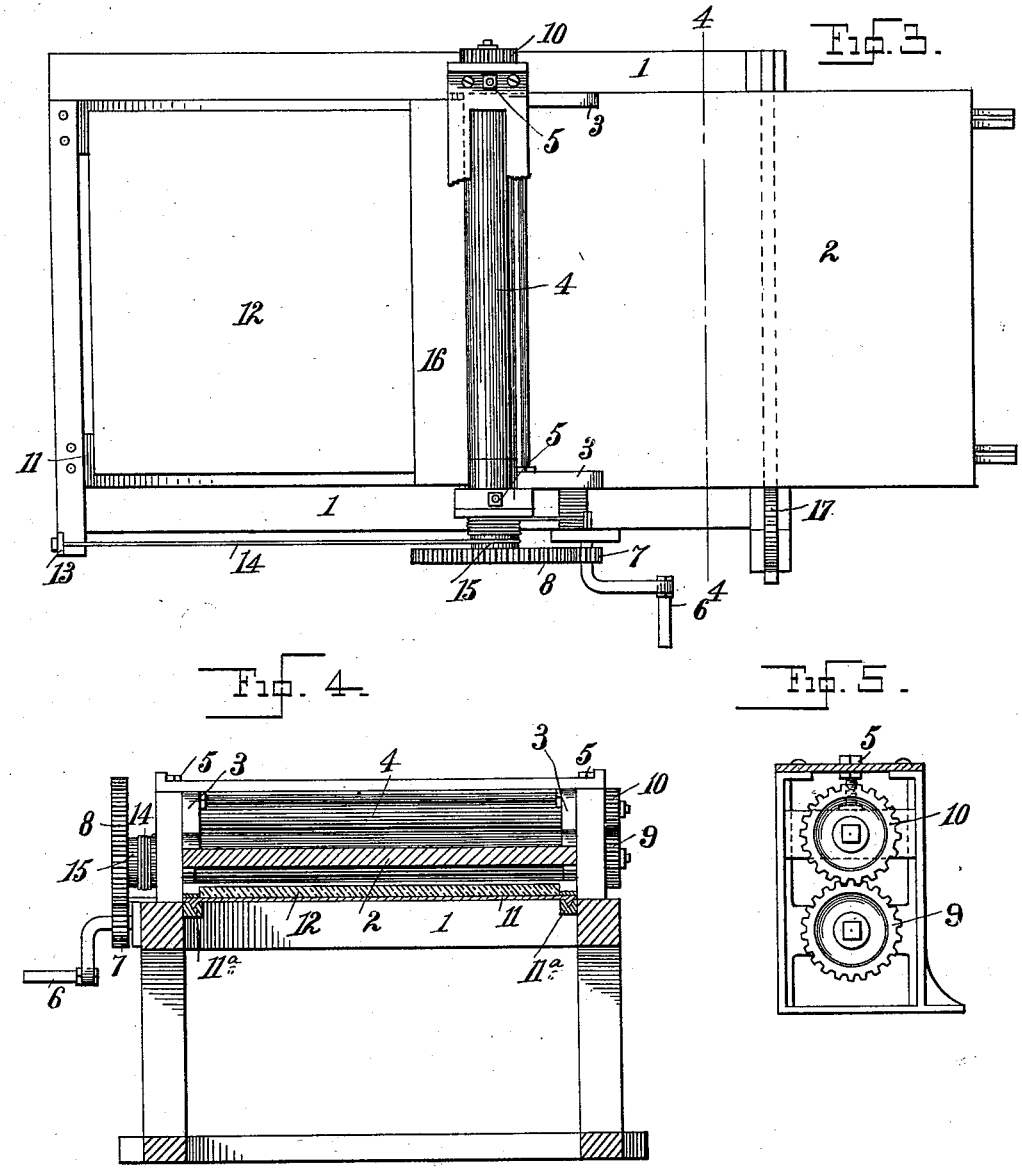

UNITED STATES PATENT OFFICE.

PETER V. PELTIER, OF OTTAWA, ILLINOIS.

MACHINERY FOR ROLLING GLASS.

SPECIFICATION forming part of Letters Patent No. 508,748, dated November 14, 1893.

Application filed June 10, 1892. Serial No. 436,235. (No model.)

*To all whom it may concern:*

Be it known that I, PETER V. PELTIER, a citizen of the United States, residing at Ottawa, in the county of La Salle, in the State of Illinois, have invented certain new and useful Improvements in Machinery for Rolling Glass, of which the following is a specification.

My invention relates to a machine for rolling sheets of glass, whether colored or uncolored or opalescent, opaque or semi-opaque, and whether smooth on both sides or having one smooth and one rippled surface, and the object of the machine as distinguished from the prior art, is to make a better article, in that the glass as it comes from the machine is more even, is tough and strong throughout, without brittle or distorted portions and evenly opaque or transparent, as the case may be, throughout; and lastly and most important in that the smooth surface is perfectly smooth, and where one side of the sheet is rippled the ripple is more regular and perfect, and the brilliancy of the sheet of glass under transmitted light is heightened; and furthermore the glass is more easily and perfectly cut.

In the old way of rolling glass the molten glass when taken from the furnace is poured upon a metal table and the table is caused to pass under a roller, or the roller is caused to pass over the table while the glass-maker manages the molten glass with a ferret, and the sidewise, spreading of the sheet is limited by adjustable guides. Various modifications of this plan have been suggested. Among them the one which probably most closely approximates my invention is a glass rolling machine in which the molten glass is poured on to an inclined stationary table and rolled between two rollers which spread it out in the form of a sheet and feed it through to a second metal table arranged also at an incline and stationary. In this machine an advantage is gained over the older form, in that both the upper and the under surfaces of the glass sheet are in but momentary contact with the parts of the machine, (namely, in the peripheries of the two rollers,) whereby the glass is being pressed into sheet form. It is objectionable to have the glass sheet remain in contact with metal longer than absolutely necessary for its formation. Where, in the old apparatus, the glass was placed on a table and the roller run over it, so as to spread it down evenly over the table's surface, the glass obtained the impression of the table and the surface of the glass in contact with the table was roughened; furthermore the table was liable to rapid and irregular heating causing irregular cooling of the glass with resulting uneven strain and brittleness and a very uneven surface. Furthermore as the table differed in temperature, corresponding differences were produced in the speed of cooling the glass, which affected its opacity at different points, for where the table was cold the glass which rested on it would become transparent, while where the table was hot the overlying glass would be more or less opaque, and these varying conditions made a very imperfect production of the glass sheet. These difficulties were not obviated by the machine above described having two rollers with inclined stationary metal tables on each side of them. Here as before, the glass was in constant contact with metal, the delivery table would become heated and the glass would receive a roughened surface therefrom, and also become irregular in its toughness and in its opacity. The delivery table being placed near the tangential point of the two rollers its receiving edge would become exceedingly hot so that as the glass sheet coming through the rollers struck it, the glass would become balled-up, the delivery of the sheet would be retarded and its form spoiled. If it were endeavored to avoid this retardation or to take the sheet away without touching the delivery table, the tongs employed would strain and distort the glass sheet. It is impossible to get a good result if the glass sheet is allowed to remain in contact with metal.

In my improved machine the molten glass is as usual placed upon a receiving table, but its only period of contact with metal thereafter is for the moment of passage between the rollers, which deliver it onto a non-conducting surface.

In the accompanying drawings: Figure 1 is a side elevation of my improved machine. Fig. 2 is a longitudinal sectional view thereof. Fig. 3 is a plan view thereof. Fig. 4 is a transverse sectional view in the plane indicated by the line 4—4 Fig. 3. Fig. 5 is a side elevation to a larger scale than the preceding figures of one of the end frames in which the rollers are mounted, showing gear wheels of equal size for driving the two rollers at the same rate of speed.

1 is the machine frame which may be of the represented or any other preferred construction. On this frame is supported a table 2 preferably of cast metal and having a smooth upper surface. This surface forms the receiving table for the molten glass.

Adjustable guides 3, limit the width of the sheet of glass to be formed and are placed at each side of the table 2 in immediate proximity to the rollers 4. Said rollers are two in number, placed one immediately over the other and arranged so that the periphery of the lower roller is slightly above the surface of table 2. Set screws 5 are provided for adjusting the height of the upper roller above the lower for the purpose of regulating the thickness of the glass sheet.

Any desired means may be employed for driving the rollers. I have here shown a winch 6 having on its shaft a pinion 7 which engages a large gear 8 on one end of the shaft of the lower roller 4, which shaft has at its other end gear 9, meshing with a corresponding gear 10 on the shaft of the upper roller. When gears 9, 10 of equal diameter are used, as shown in Fig. 5, the rollers travel at the same speed and the same result is that a sheet formed between the same has both surfaces smooth. If, however, other gears be substituted so that as shown in Fig. 4, the upper gear is the smaller, and the upper roller is geared up say with a speed of two to three, the upper surface of the glass sheet formed between the rollers will be rippled in the manner well known to the art.

11 is the delivery table mounted to slide on horizontal guides 11$^a$ on the frame 1 and having a non-conducting upper surface 12, preferably made of sheets of asbestus, but plaster-of-paris or other non-conducting material may be employed. At each end of the table 11 is connected (as for example to upright arms 13), the end of a rope or cable 14, and the other ends of the said ropes or cables are connected to and adapted to be alternately wound upon a drum 15 on the shaft of the lower roller 4.

16 is a metal apron fastened to the frame of the machine having its upper edge arranged close to the surface of the lower roller 4 and inclined so that its lower edge will lie slightly above the asbestus top or cover of table 11. The upper edge of the apron 16 instead of being brought close up to the discharge opening between the two rollers is arranged slightly below the horizontal diameter of the lower roller, so that this edge is sufficiently removed from the hot glass sheet and the hot line of contact of the rollers therewith to prevent its deleterious heating. The surface of the lower roller and the issuing glass sheet will have lost considerable heat before reaching the apron 16.

Table 2 is on one side supported by the goose-neck 17 so as to allow the free passage of the arms 13.

The operation of the machine is as follows: Before starting, the table 11 is drawn back under the table 2 in which position its outer end will be somewhere near the lower edge of the apron 16, as shown in Fig. 2. The molten glass then being poured on the table 2 the rollers are started and the glass is managed with a ferret so as to cause it to pass between the guides 3 and between the rollers, remaining but an instant in contact therewith. Passing in the form of a sheet through the same, it is directed by the apron 16 onto the asbestus top of the table 11, which as the rollers rotate and the glass sheet is laid upon it is, by the same operation which drives the rollers, drawn out till it reaches the position shown in Fig. 1, when the glass sheet having been completed and discharged from the rollers is laid upon it at full length in contact not with metal but with a non-conductor which insures its even annealing so long as it remains on the table. The result is a smoothness of finish of the glass surface which has not heretofore been attained with rolled glass.

Having thus described my invention, the following is what I claim as new therein and desire to secure by Letters Patent:

1. The combination of stationary glass delivery table 2, the reciprocating glass receiving table 11 having its top covered with a slow conductor of heat and having means for passing it under and drawing it out from under said table 2, and the two rollers 4, 4, arranged one above the other at the edge of table 2 and adapted to be operated as the table 11 is drawn out to deliver a sheet of glass thereon, substantially as set forth.

2. The combination of the stationary glass delivery table 2, the reciprocating receiving table 11 having means for drawing it under or withdrawing it from under the table 2, the rollers 4, 4, arranged one over the other at the edge of table 2 and changeable gearing 9, 10, arranged to separate one of said rollers from the other, whereby, by merely changing said gearing the upper surface of the glass sheet may be plain or rippled, substantially as set forth.

3. In a machine for rolling glass the combination of the stationary table 2 the rollers 4 arranged at one edge thereof and having suitable means of operation, the movable table 11 and the apron 16 arranged in proximity to the lower roller and adapted to deliver the glass on to the said table 11 substantially as set forth.

P. V. PELTIER.

Witnesses:
HARRY E. KNIGHT,
ALPHONSE PELTIER.